Dec. 16, 1941.    H. A. PHILLIPS    2,266,069
REFRIGERATION APPARATUS.
Filed May 13, 1939    2 Sheets-Sheet 1
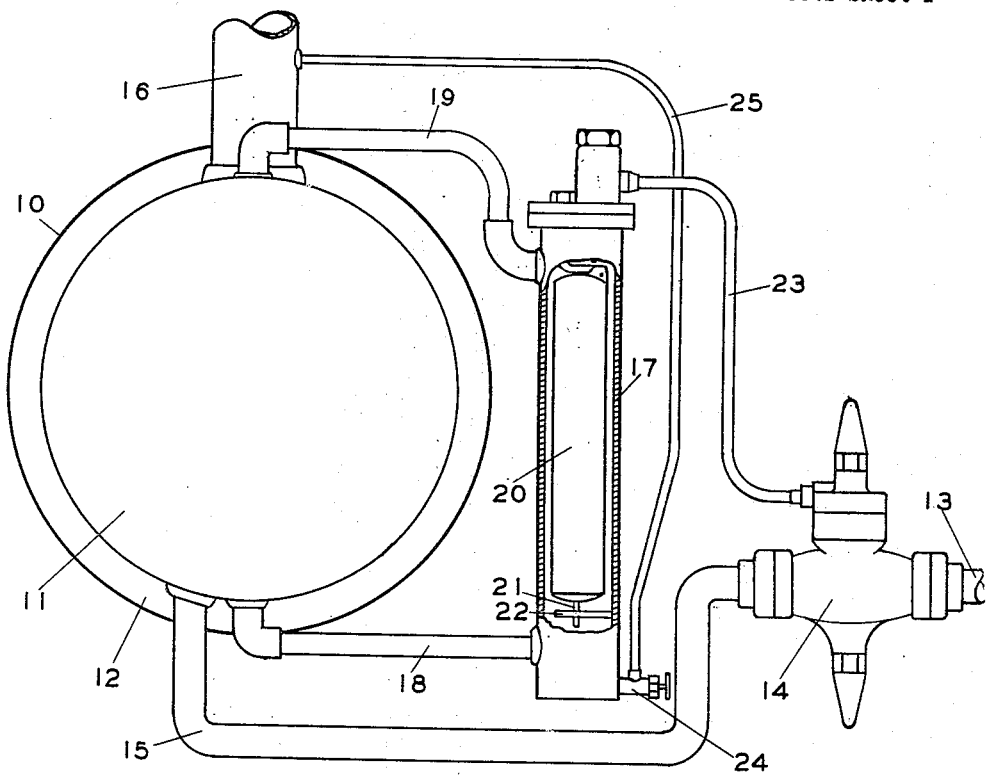
FIG. 1
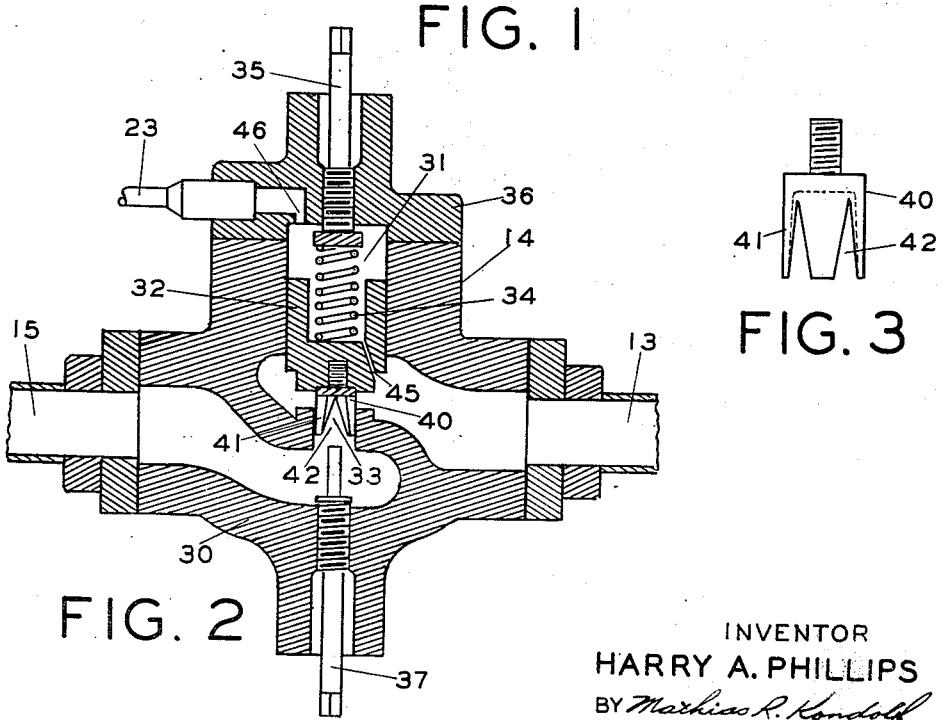
FIG. 2
FIG. 3
INVENTOR
HARRY A. PHILLIPS
BY Mathias R. Kondolf
ATTORNEY Dec. 16, 1941.   H. A. PHILLIPS   2,266,069
REFRIGERATION APPARATUS
Filed May 13, 1939   2 Sheets-Sheet 2

INVENTOR
HARRY A. PHILLIPS
BY Mathias P. Kondolf
ATTORNEY

Patented Dec. 16, 1941

2,266,069

UNITED STATES PATENT OFFICE 2,266,069

REFRIGERATION APPARATUS

Harry A. Phillips, Chicago, Ill.

Application May 13, 1939, Serial No. 273,396

10 Claims. (Cl. 62—8)

This invention relates to an improved apparatus to control the feed of refrigerant to an evaporator, and is particularly adapted for use with refrigerants of low latent heat of vaporization.

The advantages of maintaining flooded operation of an evaporator are well known. In the use of certain refrigerants, such as ammonia, which has a relatively high latent heat of evaporation, the customary direct action float valve, provided with the conventional type of ball or surface float is quite satisfactory, insofar as smoothness of operation is concerned. A deep vertical float, such as described herein, is desirable for use with ammonia where a large adjustment of liquid level is desired.

The float control herein described is designed to govern or modulate the feed of liquid refrigerant to an evaporator, and since the factors effecting its operation arise in the evaporator, or on the low or suction side of the plant, it may be called a "low side" float to distinguish from float controls which respond to factors arising on the high pressure side or entirely under condensing pressures of the plant.

In operating an evaporator, particularly a shell cooler, with a refrigerant such as "Freon," which has a comparatively low latent heat of vaporization, it is necessary to supply the evaporator with a relatively large quantity of the liquid refrigerant for a given load, and as the circulation of refrigerant through the system is fast, it is especially important to feed the liquid into the evaporator smoothly or in a uniform manner.

Factors effecting the smooth operation of an evaporator and the maintenance of the desired liquid level for most efficient operation are,— "flash gas," which is gas evaporated to effect the initial cooling of the warm liquid refrigerant entering the evaporator—sharp fluctuations in feed causing sharp variations in the quantity of "flash gas" to be withdrawn; momentary surging of the main body of liquid in the shell, giving a false surface level, caused by any sharp drop in rate of feed and the resultant increased amount of gas evaporated from the liquid; changing specific gravity of the mixture of vapor and liquid refrigerant in the evaporator; and momentary "pump downs" brought about by the faulty control of the ordinary float valve having a surface float. Because of its sensitivity to liquid surface changes and conditions, the surface float does not respond, after shutting off, to the true liquid level in the evaporator, until a considerable pump down has taken place, and this delay causes a serious loss in capacity and efficiency.

A shallow or surface float does not respond to the specific weight of the mixture of liquid and gas below the bottom of the float, and when such a shallow float begins to throttle, and a slight surging occurs, the shallow float is apt to close off completely.

In order to secure proper modulation in feeding a large quantity of refrigerant liquid, I prefer to use the deep float to operate a valve which will smoothly feed the refrigerant to the evaporator in response to conditions in the evaporator.

The piston valve used is designed for modulating action. Such a valve should be designed to require a rather large change in pressure in the feeler line in order to move the valve from a fully open to a fully closed position. A spring designed to place pressure on the piston to partly compensate for the drop in pressure above it, is used. By means of a metering plug sliding in the aperture in the valve, the piston is caused to move through a considerable distance to fully open the valve. A movement of the piston valve almost as great as the diameter of the port is preferred. This makes possible a smooth balance between the spring and the various refrigerant pressures against the piston, and a small change in pressure in the feeler line results in only a small movement of the piston valve.

A principal object of this invention is to provide a float control which will feed liquid smoothly into an evaporator and maintain a modulating flow of liquid during changes in load and evaporator conditions.

A particular object of this invention is to provide a float which extends vertically from a point close to the horizontal plane through the bottom of the evaporator to a point substantially above the liquid level to be maintained in the evaporator, and thereby responds to the true equivalent liquid level in the evaporator, and to the actual weight of the entire column of liquid in the vertical float chamber around it.

A further object of the invention is to provide a pilot valve to govern the pressure in a pilot or feeler line in accordance with the evaporator conditions.

A further object of the invention is to provide a valve, under pilot control, to feed refrigerant to an evaporator to meet load demands and so modulate the feed to secure proper operation of the evaporator.

A further object of the invention is to provide a means of removing accumulations of oil in the float chamber.

To these and other ends the characteristic features and advantages of my improvement will more fully appear in the following description and the accompanying drawings in illustration thereof.

In the drawings, in which like reference numerals represent like parts,

Fig. 1 is a general view of the apparatus with the float chamber partly cut away to show depth of float.

Fig. 2 is a cross section of a pilot operated liquid feed valve.

Fig. 3 is an elevation of the metering plug used in the valve of Fig. 2.

Figure 4:
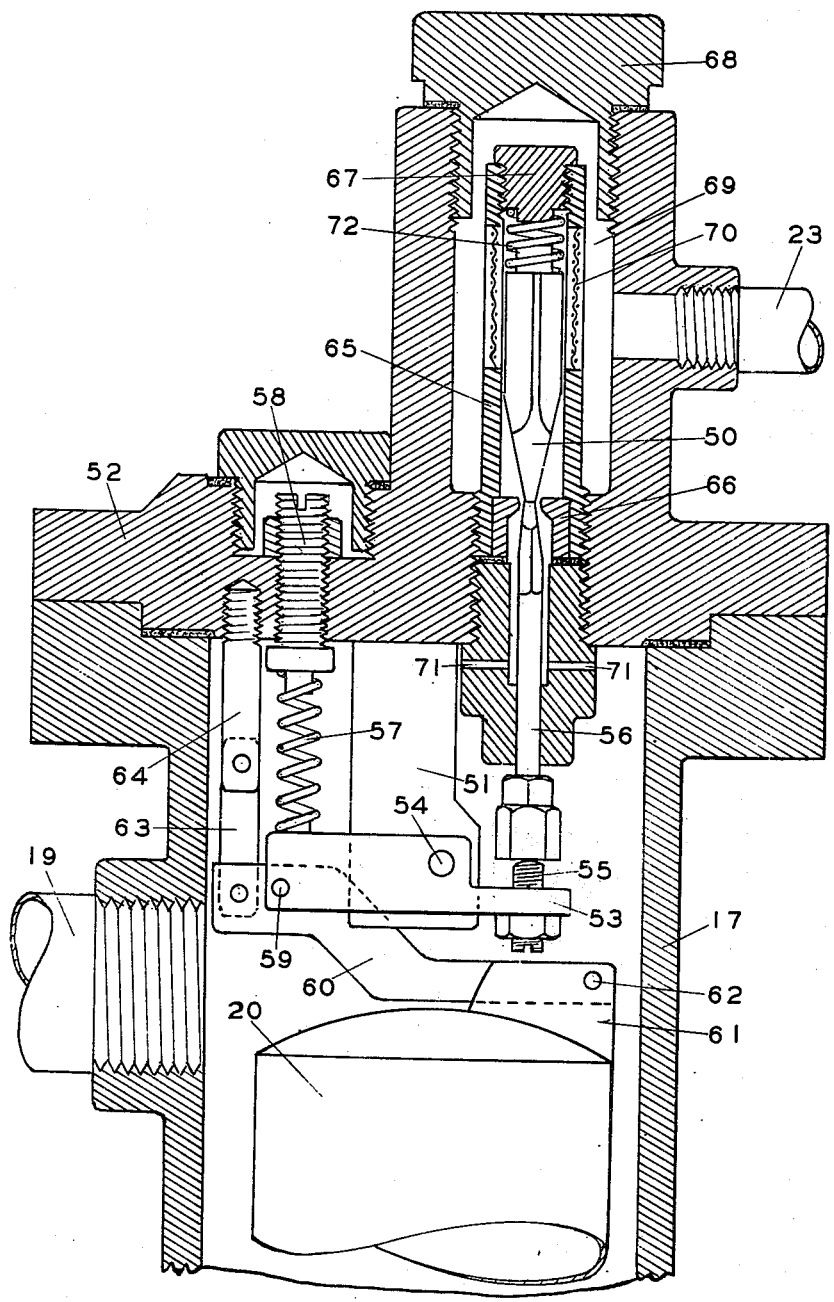
Fig. 4 is a cross sectional view of the upper end of the float chamber with the float and valve mechanism (shown in elevation) in position.

Referring to Fig. 1, the evaporator 10 comprises an inner tank 11 and an outer shell 12. Refrigerant is fed to the tank 11 and the liquid to be cooled is fed to the annular space between the tank 11 and the outer shell 12.

The large volume of gas which must be withdrawn from the evaporator in the use of a refrigerant such as "Freon" having a comparatively low "heat of vaporization" results in the formation of what may be described as an emulsion throughout the body of liquid refrigerant, due to vaporization throughout the flooded portion of the evaporator, wherever heat units are picked up. In order to avoid "plugging" the evaporator or choking it by gas formation, it is essential that frictional resistance to the egress of the vapor from the body of the refrigerant be kept as low as possible. To accomplish this, I have shown a simple form of evaporator wherein the refrigerant is maintained as a body of substantial volume within the tank 11. As stated above, the liquid to be cooled is fed to the annular space between the tank 11 and the outer shell 12. The liquid to be cooled may be fed through a plurality of tubes passing through the tank 11 (like the construction used in the well known shell and tube type evaporator) and still secure a minimum of resistance for the flow of vapor.

The combination of a deep float, of the length specified, with an evaporator constructed to have slight or no frictional resistance to the egress of gas from the body of refrigerant contained in the evaporator, is an essential feature of the present invention. This construction distinguishes from the use of a deep float with an evaporator having the refrigerant contained in tubes which cause relatively high frictional resistance to the egress of gas. In such a construction the movement of vapor upwardly through the tubes lifts or entrains the liquid therewith. The pumping of the liquid as described is not uniform and the resulting fluctuating liquid level in the float chamber is not a true index of evaporator conditions.

Liquid refrigerant is supplied to the evaporator, from the plant liquid receiver or condensers, through the pipe 13, the valve 14 and the pipe 15. Vaporized refrigerant is withdrawn from the evaporator through the plant suction pipe 16.

The float chamber 17 is mounted adjacent to the evaporator 10 and is connected at the bottom by the pipe 18, and at the top by the pipe 19, to the evaporator tank 11. The vertical deep float 20 is positioned within the chamber 17 and is guided at its lower end by the stud 21 engaging with the shelf 22 fixed in the float chamber.

As shown in Fig. 4 the float 20 operates the pilot valve mechanism which governs the flow in the pipe line 23 leading to the valve 14.

An oil bleeder valve 24 connects through the pipe 25 with the suction line 16 and provides a means of removing oil from the float chamber 17.

The pressure in the evaporator, and in the interconnected float chamber, is somewhat higher than in the suction line 16 because of the vaporization of refrigerant under load conditions, and thus the oil bleed 25 can generally be carried upwardly to the suction line 16 as shown in Fig. 1. In some cases, for example, where a load is very light at times, it would be desirable to run the bleeder pipe 25 to a suction line on the same level or below the oil outlet 24.

Referring to Fig. 2, the pilot operated liquid feed valve comprises the housing 30 having a cylindrical bore 31 adapted to receive the piston 32. When in its lower position the piston 32 shuts off the valve aperture 33 and thus stops the flow of liquid through the valve 14 into the feed pipe 15. The piston valve spring 34 may be more or less compressed by the adjusting screw 35 which is mounted in the valve cover 36 attached to the housing 30. A screw 37 is vertically adjustable below the piston 32 and provides a means of holding the piston in an elevated position to permit passage of liquid through the aperture 33.

The lower end of the piston 32 carries a metering plug 40 which (as shown in Fig. 3) is provided with a skirt 41 with preferably tapered openings 42. This plug slides within the aperture 33 and the openings 42, through the skirt of the plug, are of such an area and so positioned as to secure a relatively large movement or travel of the piston 32 in order to obtain a full opening of the valve 14.

Piston 32 has a by-pass as shown at 45, and this permits a small amount of the liquid refrigerant from the pipe 13 to pass through the piston into the bore or cylinder 31. The pilot tube 23 is also connected through the port 46 with the cylinder 31. From this construction it will be noted that the pressure in the cylinder 31 will tend to equalize with that in the pipe 13 and unless this pressure is removed through the pilot pipe 23 it will build up and in conjunction with the pressure of the spring 34 cause the piston 32 to move downwardly and close the aperture 33 in the valve 14.

The by-pass 45 may be located in the housing 30 and if desired may include a valve to vary the effective area of the by-pass.

Referring to Fig. 4 the float 20 operates the pilot needle valve 50 through a compound linkage which comprises the support 51, attached to the float chamber head 52, and having the rocker arm 53 fulcrumed at 54. One end of the arm 53 carries the adjusting screw 55 which contacts the valve push rod 56. The other end of the arm 53 is pressed downwardly by the compression spring 57 which in turn may be adjusted by the adjusting screw 58. The arm 53 engages, by means of the pin 59, the link 60 one end of which is connected to the float bracket 61 by the pin 62. The other end of the link 60 is supported by the swinging link 63 which is attached to the float chamber head through the stud 64.

The needle valve 50 slides within the casing 65 and is preferably angular in shape to provide a passage along the valve sides. The tapered lower end of the valve 50 seats in the valve seat 66. The plug 67 engages the casing 65 and holds the spring 72 in compression against the needle valve 50.

The casing 65, together with the valve 50, the spring 72 and the valve seat 66 may be removed and replaced upon removing the access plug 68.

The flat lower end of the valve 50 engages with the upper end of the push rod 56 and the valve 50 is forced away from the valve seat 66 by upward motion of the push rod 56. The access plug 68 seals the chamber 69 in which the valve casing 65 is mounted. The feeler line 23 connects with the chamber 69 and through the screened openings 70 with the interior of the casing 65 and the space around the push rod 56. The ports 71 connect the space around the push rod 56, with the interior of the float chamber 17 and thus a reduced pressure within the float chamber 17 will cause (when pilot valve is open) a flow through the pipe 23, past the valve seat 66 and through the port 71 into the float chamber 17. The pipe 19, as shown in Fig. 1, connects the float chamber 17 with the evaporator tank 11.

From Fig. 4 it will be noted that a lowering of the float 20 within the chamber 17 will pull downwardly on the pin 62 and the link 60. This in turn will draw the pin 59 and one end of the rocker arm 53 downwardly, the compression spring 57 assisting in this motion. The other end of the rocker arm 53 carrying the screw 55 will move upwardly and raise the push rod 56 and the valve 50. This movement will lift the valve 50 off its seat (if in contact) and, as described above, connect the pilot pipe 23 with the float chamber 17.

When the valve 50 opens, the pressure in the feeler line 23 is lowered and this in turn lowers the pressure in the cylinder 31 above the piston 32 of the valve 14. The piston then rises against the spring, assuming a position to balance the various pressures exerted upon it. Pressure in the cylinder 31 is controlled by the varying pressure in the feeler line 23.

It will be evident that the position of the piston 32 (or degree of opening of the valve 14) will be controlled by four factors, acting in combination, namely, (a) The position of the deep float, responsive to the true liquid level of the refrigerant in the evaporator, controlling the degree of opening of the pilot valve.
(b) The suction pressure in the evaporator.
(c) The effective area of the by-pass in the feed valve in relation to the plant pressure of the liquid refrigerant.
(d) The pressure exerted by the spring on the feed valve piston.

Adjustment of the screw 58 downwardly will increase the pressure exerted by the spring 57 and result in a higher liquid level in the evaporator.

It will be evident that the deep float disclosed herein may be utilized to advantage in a direct action feed valve, as well as with a pilot operated valve.

I claim:

1. A float valve for an evaporator comprising a deep float, positioned in an interconnected float chamber adjacent to said evaporator, and of a length to extend vertically from a point close to the horizontal plane of the bottom of said evaporator to a point above the liquid level to be maintained in said evaporator; a needle valve normally held on a valve seat by spring pressure; a push rod engaging said needle valve; means adapted to operate said push rod upon movement of said float and a spring to exert pressure against upward movement of said float.

2. A feed valve for the control of a refrigeration evaporator comprising a valve housing having an inlet port for high pressure liquid refrigerant and an outlet port for said refrigerant connected to said evaporator; a passage between said ports; a cylinder in said housing and a piston in said cylinder; a metering plug attached to said piston and adapted to fit within said passage and vary the effective area of said passage upon movement of said piston; a by-pass between said inlet port and said cylinder; means to vent said cylinder; a spring to exert pressure on said piston; means to vary the pressure of said spring and an adjustable stop to provide for a minimum opening through said passage.

3. A feed valve for the control of a refrigeration evaporator comprising, in combination, a valve housing having an annular inlet port for high pressure liquid refrigerant; an outlet port for refrigerant connected to said evaporator; a passage between said ports; a cylinder in said housing and a piston in said cylinder; a metering plug attached to said piston and positioned within said passage; said metering plug comprising a body, a skirt and tapered openings in said skirt to cooperate with said annular inlet port and provide radial passages through said skirt to said outlet port to vary the effective area of said passage upon movement of said piston; a by-pass between said inlet port and said cylinder; means to vent said cylinder; a spring to exert pressure on said piston and means to vary the pressure of said spring.

4. A feed valve for the control of a refrigeration evaporator comprising, in combination, a valve housing having an annular inlet port for high pressure liquid refrigerant; an outlet port for refrigerant connected to said evaporator; a passage between said ports; a cylinder in said housing and a piston in said cylinder; a metering plug attached to said piston and positioned within said passage; said metering plug comprising a body, a skirt and tapered openings in said skirt to cooperate with said annular inlet port and provide radial passages through said skirt to said outlet port to vary the effective area of said passage upon movement of said piston; a by-pass between said inlet port and said cylinder; and means to vent said cylinder.

5. The combination, in refrigeration apparatus, of an evaporator containing a space for a body of liquid refrigerant and providing for substantially free egress of vapor from said liquid, a plant suction line to said evaporator; a liquid feed line to said evaporator; a float chamber having its lower and upper portion connected to the refrigerant space within the evaporator; a float in said chamber extending from a plane substantially through the lowest point in said space to a point above the plane of the liquid level in the float chamber and a control valve operable by said float.

6. The combination, in refrigeration apparatus, of an evaporator containing a space for a body of liquid refrigerant and providing for substantially free egress of vapor from said liquid, a plant suction line to said evaporator; a liquid feed line to said evaporator; a float chamber having its lower and upper portion connected to the refrigerant space within the evaporator; a float in said chamber extending from a plane substantially through the lowest point in said space to a point above the plane of the liquid level in the float chamber; a control valve operable by said float and means to bleed oil from said float chamber into said suction line.

7. The combination, in refrigeration apparatus, of an evaporator containing a space for a body of liquid refrigerant and providing for substantially free egress of vapor from said liquid, a plant suction line to said evaporator; a liquid feed line to said evaporator; a float chamber having its lower and upper portion connected to the refrigerant space within the evaporator; a float in said chamber extending from a plane substantially through the lowest point in said space to a point above the plane of the liquid level in the float chamber; a pilot line connected to said float chamber and a pilot valve operable by said float and governing the flow in said pilot line.

8. The combination, in refrigeration apparatus, of an evaporator containing a space for a body of liquid refrigerant and providing for substantially free egress of vapor from said liquid, a plant suction line to said evaporator; a liquid feed line to said evaporator; a float chamber having its lower and upper portion connected to the refrigerant space within the evaporator; a float in said chamber extending from a plane substantially through the lowest point in said space to a point above the plane of the liquid level in the float chamber; a pilot valve operable by said float; a balanced piston operated feed valve to modulate the feed of refrigerant to said evaporator and a pilot line connecting said pilot valve and said feed valve.

9. The combination, in refrigeration apparatus, of an evaporator containing a space for a body of liquid refrigerant and providing for substantially free egress of vapor from said liquid; a plant suction line to said evaporator; a liquid feed line to said evaporator; a float chamber having its lower and upper portions connected to the refrigerant space within the evaporator; a float in said chamber extending from a plane substantially through the lowest point in said space to a point above the plane of the liquid level in the float chamber; a pilot valve, operable by said float; a balanced piston operated feed valve to modulate the feed of refrigerant to said evaporator and a pilot line connecting said pilot valve and said feed valve; and means to bleed oil from said float chamber.

10. The combination, in refrigeration apparatus, of an evaporator containing a space for a body of liquid refrigerant and providing for substantially free egress of vapor from said liquid, a plant suction line to said evaporator; a liquid feed line to said evaporator; a float chamber having its lower and upper portion connected to the refrigerant space within the evaporator; a float in said chamber extending from a plane substantially through the lowest point in said space to a point above the plane of the liquid level in the float chamber; a pilot valve, operable by said float; a balanced piston operated feed valve to modulate the feed of refrigerant to said evaporator and a pilot line connecting said pilot valve and said feed valve; and means to bleed oil from said float chamber into the suction line from said evaporator.

HARRY A. PHILLIPS.